Dec. 26, 1967 F. KNOCHENHAUER ET AL 3,360,615
CIRCUIT ARRANGEMENT FOR SWITCHING THE AMPLIFIER IN TAPE RECORDERS AND DICTATING MACHINES
Filed July 13, 1964
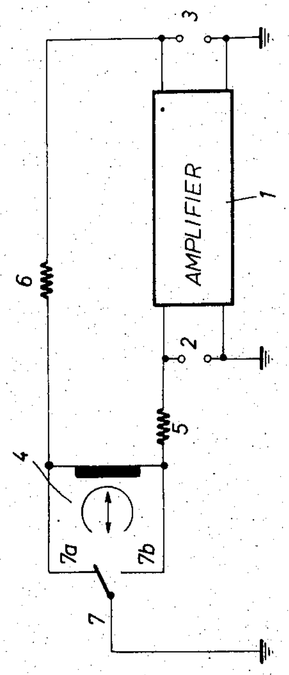
INVENTORS
FRIEDRICH KNOCHENHAUER
GUNTER LOFFLER
BY Percy P. Lantzy
ATTORNEY United States Patent Office 3,360,615
Patented Dec. 26, 1967

3,360,615
CIRCUIT ARRANGEMENT FOR SWITCHING THE AMPLIFIER IN TAPE RECORDERS AND DICTATING MACHINES

Friedrich Knochenhauer and Gunter Loffler, Altena, Westphalia, Germany, assignors to International Standard Electric Corporation, New York, N.Y., a corporation of Delaware Filed July 13, 1964, Ser. No. 382,113
Claims priority, application Germany, July 20, 1963, St 20,886
1 Claim. (Cl. 179—100.2)

ABSTRACT OF THE DISCLOSURE

A circuit arrangement to switch-over the amplifier in tape recorders which requires only one switch-over contact, instead of a multiple number of contacts. The arrangement eliminates feedback because the capacitance existing between the contacts of the switch is placed in parallel with the input or output of the amplifier and ground.

This invention refers to switching circuits and more particularly to a circuit for switching a reversible amplifier in a tape recorder and playback machine in accordance with the desired function of the pick-up head of the machine.

Besides high-quality and expensive studio-type tape recorders, a reversible amplifier is used in home entertainment recorders for the amplification of recording and reproduction. The degree of amplification of such amplifiers is approximately $3 \times 10^5$. During reproduction, the pick-up head is connected to the amplifier input and during recording to the amplifier output. Due to the high amplification it is difficult in practice to design the contacts, necessary for switching over, to be so low in capacitance, that oscillation of the amplifier can be prevented.

In many cases the input line which can be switched over is separated by two pairs of contacts, whereby the line between both contacts is neutralized. The same also applies for the output of the amplifier. Such switch-over devices consequently require a large number of contacts.

The object of the invention is to provide a circuit arrangement for switching over tape recorder amplifiers in which no adverse retrograde effect exists.

A feature of this invention is that one terminal of the pick-up head is directly connected with one of the firm contacts of a switch and with the input of the amplifier via a decoupling resistor, the other terminal of the pick-up is directly connected with the other firm contact of the switch with the input of the amplifier via a decoupling resistor, and that the mobile contact of the switch is grounded.

The circuit arrangement, according to the invention, has the advantage that for a switching-over, completely free from feed-back, only a simple change-over contact is necessary, instead of a switching-over device with many contacts and shielded lines.

Construction and mode of operation of the circuit arrangement, according to the invention will be best understood with the aid of the accompanying functional circuit diagram.

The pick-up head 4 is connected to the amplifier 1 with the input terminals 2 and the output terminals 3 in such a manner that one terminal is connected with the input of said amplifier via a decoupling resistor 5 and the other terminal with the output via the decoupling resistor 6. The switch 7 in any case connects one of the pick-up terminals to ground.

When contacts 7/7*a* is closed an already recorded program can be reproduced. If the contacts 7/7*b* are connected the output voltage of the amplifier 1 reaches the pick-up 4 via the decoupling resistor 6 to record a program. The input 2 of the amplifier 1 is then terminated by the resistor 5 the value of which should be approximately equal to the impedance of the microphone to be connected. The capacity existing between the contacts of the switch 7 is no longer between the input and the output of amplifier 1, but in parallel to the input and output terminals, respectively, of the amplifier 1 and ground. No feed-back can occur by virtue of the switch capacitance. It is, of course, possible to add reactances to correct the frequency response as is well known in the prior art.

While we have described above the principles of our invention in connection with specific apparatus, it is to be clearly understood that this description is made only by way of example and not as a limitation to the scope of our invention as set forth in the objects thereof and in the accompanying claim.

We claim:

A circuit arrangement to switch the amplifier in a tape recorder and playback machine comprising:

an amplifier having two input and two output leads, one each of said input and output leads being grounded;

a switch having two fixed contacts and a grounded movable contact;

a pick-up head having two terminals, one terminal of said head being connected to one of said fixed contacts, and the other terminal of said head being connected to the other of said fixed contacts;

an input decoupling resistor connected between the ungrounded input lead of said amplifier and said one terminal of said head; and an output decoupling resistor connected between the ungrounded output lead of said amplifier and said other terminal of said head.

References Cited

UNITED STATES PATENTS

| | | | |
|---|---|---|---|
| 2,539,121 | 1/1951 | Dashiell | 179—100.2 |
| 2,810,791 | 10/1957 | West et al. | 179—100.2 |
| 2,938,963 | 5/1960 | Waldhauer | 179—100.2 |
| 2,965,722 | 12/1960 | Shorb | 179—100.2 |

OTHER REFERENCES

N. M. Haynes: "Transistor Circuits for Magnetic Recording," Bobbs-Merrill Co., Inc., Indianapolis, Ind., January 1964, pp. 272–278.

BERNARD KONICK, *Primary Examiner.*

L. G. KURLAND, J. R. GOUDEAU, *Assistant Examiners.*